United States Patent
Sieber et al.

(12) 
(10) Patent No.: US 6,370,589 B1
(45) Date of Patent: Apr. 9, 2002

(54) PROCESS FOR PERFORMING AT LEAST ONE TEST ON AT LEAST ONE OF THE OBJECTS OF AN OBJECT-ORIENTED PROGRAM CAPABLE OF RUNNING IN PARALLEL ON A COMPUTER

(75) Inventors: Stefan Sieber, München; Sebald Kolb, Ottobrunn; Andreas Elstner, Fulda, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/416,827

(22) PCT Filed: Oct. 5, 1993

(86) PCT No.: PCT/DE93/00934

§ 371 Date: Apr. 17, 1995

§ 102(e) Date: Apr. 17, 1995

(87) PCT Pub. No.: WO97/09432

PCT Pub. Date: Apr. 28, 1994

(30) Foreign Application Priority Data

Oct. 15, 1992 (DE) .......................................... 42 34 830

(51) Int. Cl.⁷ ................................................. G06F 9/00

(52) U.S. Cl. ........................... 709/315; 709/330; 714/38

(58) Field of Search ........................ 395/700; 709/310, 709/313, 315, 330, 318; 707/10; 714/38

(56) References Cited

U.S. PATENT DOCUMENTS

| | | | | |
|---|---|---|---|---|
| 4,910,663 A | * | 3/1990 | Bailey | 364/200 |
| 5,093,914 A | * | 3/1992 | Cpolien et al. | 395/700 |
| 5,390,325 A | * | 2/1995 | Miller | 395/575 |
| 5,490,249 A | * | 2/1996 | Miller | 395/183.14 |

FOREIGN PATENT DOCUMENTS

EP 0168307 1/1986

OTHER PUBLICATIONS

Stevens, W. Richard, Advanced Programming in the UNIX Environment, Addison–Wesley, pp. 232–235, Dec. 1992.*
Edward T. Smith, "A Debugger for Message–Based Processes", Software Practice & Experience, vol. 15, No. 11, Nov. 1985, Chichester, GB, pp. 1074–1086.
Dr. Stefan Kaneff et al., "Hardwareunabhöngig Und Objektorientiert", Elektronik, vol. 40, No. 21, Oct. 15, 1991, Munchen, DE, pp. 204–212.
Beatrice Lazzerini et al., "Event–Driven Debugging for Distributed Software", Microprocessors and Microsystems, vol. 12, No. 1, Jan. 1988, London GB, pp. 33–39.
J.F. Grant, "Nondegrading Operating System Hooking", IBM Technical Disclosure Bulletin, vol. 16, No. 2, Jul. 1973, New York, U.S., p. 541.
Dipl.–Ing. Peter Liggesmeyer, "Modultest Und Modulverifikation", Angeandte Informatik, Bd 4, ISBN 3–411–14361–4, Mannheim, Wien, Zurich, 1990.
Herausgegeben von H. Schwärtzel, "Ein Vektorisierender Pascal–Compiler", Informatik in der Praxis, Berlin–Heidelberg New York, 1986.

* cited by examiner

Primary Examiner—Zarni Maung
(74) Attorney, Agent, or Firm—Schiff Hardin & Waite

(57) ABSTRACT

The description of the invention relates to a process for performing tests by means of which functionality and the real-time behavior of objects derived from concurrent classes can be tested. The particular advantage of the process according to the invention is that it is not individual objects that are instrumented for test purposes, but rather that the operating system is instrumented for test purposes. Furthermore, one major advantage lies in the fact that allocation information of source code to object code is used during testing which provides the programmer with a simple means of inputting test scenarios.

10 Claims, 2 Drawing Sheets

PROCESS FOR PERFORMING AT LEAST ONE TEST ON AT LEAST ONE OF THE OBJECTS OF AN OBJECT-ORIENTED PROGRAM CAPABLE OF RUNNING IN PARALLEL ON A COMPUTER

BACKGROUND OF THE INVENTION

The development trend in information technology is increasingly toward parallel systems. There are two basic ways of realizing such systems. On the one hand, the hardware can be realized in parallel (vector such as a processor or, transputer). With developments of this type, the parallel design at the hardware level is taken into account by suitable compilers at the software level, as described in the publication by G. Raebel, Ein vektorisierender Pascal-Compiler from Informatik in der Praxis:Aspekte ihrer industriellen Nutzanwendung, Springer-Verlag, 1986, pages 220–221. This situation is usually referred to as low-level parallelism.

A further realization approach is high-level parallelism. In this case, the mapping of parallel objects of the real world onto parallel units in the software is already begun during the software design phase. The object-oriented programming technique is increasingly being used for this. Objects capable of running in parallel can be processed in the operating system used irrespective of the underlying hardware architecture. The term concurrent class has become established to describe the classes from which such objects capable of running in parallel are derived.

The testing of such concurrent class objects brings up new problems. These problems result firstly from the higher level of abstraction on which the programmer works during object-oriented programming. Secondly, these problems arise from the parallelism, particularly in the case of the time-dependent process communication between objects that takes place in time-critical applications.

Test processes shown in, for example, the publication by Peter Liggesmeyer, Modultest und Modulverifikation: state of the art, BI-Wissenschaftsverlag, 1990, pages 49–51, hitherto known from the literature are based on the fact that software modules are instrumented for example. This means that the software to be tested is provided with an additional section of special software code which permits statements, or conclusion about the operability of the software to be made during program execution. Particularly in connection with program modules which are capable of running in parallel on one processor and which communicate with one another in a time-dependent manner, this process has serious disadvantages:

The software to be tested is changed by the instrumentation. This change affects the runtime behavior.

The temporal execution of the objects in relation to one another is affected by these interventions in the software to be tested.

The level to which buffers are filled for process messages is affected.

Taken together, the effect of these disadvantages is that with the test processes to date, it is impossible to make any absolute statements about the runtime behavior and execution of the software under observation shown in, for example, the publication by Peter Liggesmeyer, Modultest und Modulverifikation: state of the art, BI-Wissenschaftsverlag, 1990, pages 49–51.

SUMMARY OF THE INVENTION

An object of the invention is to provide a process for performing at least one test on at least one of the objects of an object-oriented program capable of running in parallel on a computer.

This object is achieved by a process for performing at least one test on at least one of the objects of an object-oriented program capable of running in parallel on a computer, having the following features:

a) a method call takes place via routines for message exchange provided in an operating system of the computer, the routines being executed via an interrupt handler in the operating system of the computer, b) it is checked with each interrupt handling caused by step a) whether the computer is to operate in a test mode, c) interactively input tests or automatic tests are processed during the test mode, d) a system clock of the computer is paused during the processing of tests, e) during the processing of the tests, allocation information of the object code to the source code of the object-oriented program and vice versa is accessed.

Further developments of the invention provide that in the process all interrupt handling apart from that for the input and output is blocked during the processing of the tests. As a further development, at least one method call is changed, suppressed and/or additionally incorporated. The process provides that the runtime of an object is determined by the system time that elapses between two successive method calls.

Additional advantages are provided when the allocation information relates to method names. Also, the allocation information preferably relates to parameter values. Specifically, the allocation information relates to parameter data types. In a preferred embodiment, the allocation information relates to parameter designations.

A particular advantage of the application of the process according to the invention is that specific test scenarios can be readily created by starting or terminating individual objects.

In order not to influence the execution of the test, it is favorable, with the interrupt handling provided in the process according to the invention, to permit only interrupts for input and output in the operating system during the test phase.

When applying the process according to the invention, it is favorable that method calls can be changed, suppressed, logged or added simply, with a comparison of a current method call with a given nominal method call being possible.

It is furthermore favorable when using the process according to the invention that buffer contents can be read nondestructively, and that it is possible to obtain information about pending method calls in connection with objects by analyzing the queues of the operating system.

The pausing of the system clock envisioned according to the invention proves to be favorable if one wishes to establish the runtime of an object, since this is obtained from the difference in time between two successive method calls.

The provision of allocation information during the test is particularly favorable in the process according to the invention. This also makes it possible for the programmer to test from the level of abstraction that is customary for him during programming. The allocation information creates a link from the abstraction level of the object-oriented programming to the object code level. Information such as object name, parameter type, parameter name, parameter data type, which is lost during compilation is restored as a result of the allocation information.

This makes it possible for the programmer to design his test to be efficient, since he can use the same designations for parameter names and object names as during programming in order to create corresponding test scenarios.

BRIEF DESCRIPTION OF THE DRAWINGS

The invention will be explained further below with reference to exemplary embodiments.

DETAILED DESCRIPTION OF THE PREFERRED EMBODIMENTS

Figure 1:
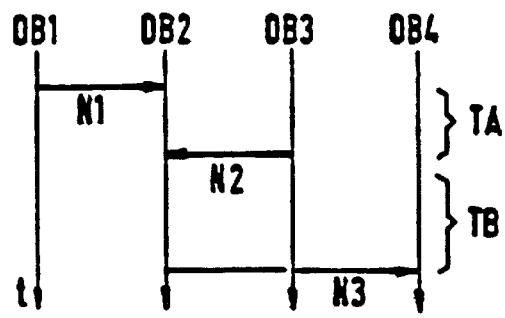
FIG. 1 shows the exchange of messages between objects running in parallel.

FIG. 1 illustrates in more detail the time-dependent exchange of messages between objects running in parallel. The calls taking place between the objects are expressed as the sending of messages n1 to n3 in the operating system level. A sequence chart with four executing objects OB1 to OB4 is shown in FIG. 1. OB1 sends a method call N1 to OB2 at an arbitrary point in time. At the latest 50 milliseconds later, OB3 must likewise send a method call N2 to OB2. This object in turn sends a method call N3 to object OB4 a maximum of 100 milliseconds later. For every message caused by the method calls, its form and its content are specified. For instance, the message contains the method indices, as well as the corresponding parameter designations and parameter values in a fixed sequence. TA and TB denote the time conditions to be met for the sending of messages between the objects running in parallel. TA must be less than 50 milliseconds here, and TB must be less than 100 milliseconds.

The following could then happen in the case of testing by means of instrumenting the individual objects, object OB1 being instrumented for example. If the test is executed under real-time conditions, the processing of the additionally inserted instrumentation software requires more than 50 milliseconds of the processor time for example. The message N1 to the object OB2 consequently arrives there too late. This in turn causes TA to be longer than 50 milliseconds. The condition of the sequence chart is therefore not met, and the software executes incorrectly. Analogous observations can be made for the object OB2 and the sending of the message N3 to the object OB4, which then lead to the time condition TB not being met.

Figure 2:
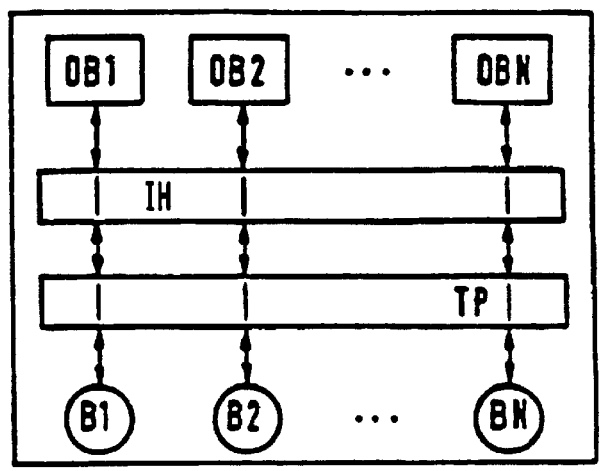
FIG. 2 shows the incorporation of a test program in an operating system with interrupt handling.

By way of example, FIG. 2 shows a structure that shows how a test program can be incorporated in the operating system, which provides interrupt handling for the exchange of messages, in accordance with the process according to the invention.

Objects OB1 to OBn which are capable of running in parallel, the interrupt handler IH and buffers B1 to BN assigned to the individual objects are shown. The intention is to illustrate the following situation: during the normal mode the objects capable of running in parallel exchange messages by means of method calls in that they initiate a specific message interrupt handling via the interrupt handler IH of the operating system. The interrupt handler for message exchange then accesses the contents of the individual buffers and transfers the messages from the buffer of the sending object to the buffer of the receiving object.

It can clearly be seen that the test program TP is an integral part of the operating system, and that during normal mode the individual buffers B1 to BN are accessed transparently by the test program TP via the interrupt handler IH.

If the programmer wishes to test the individual objects, he then causes the test program to become active on the objects to be tested by monitoring the message contents, for example the sending and receiving addresses. This is accomplished, for example, by making the objects to be tested known to the test program in lists.

For test purposes it is readily possible to generate test scenarios by starting and terminating objects, for example by logging, changing, suppressing or adding messages.

It is furthermore possible to read the buffer contents B1 to Bn non-destructively. In addition, the paused system clock can be read. It is furthermore possible to observe the process environment, which is represented by the objects being executed here, by analyzing the queues of the operating system.

It is additionally possible to simulate objects by adding messages and clearing buffer contents. For example, method calls of as yet unrealized objects can be generated.

With the process according to the invention it is therefore possible to make absolute statements about the real-time behavior and the execution of the objects OB1 to OB4 under observation with the test program. Moreover, it can also be seen from FIG. 2 that the test program TP is not part of the objects OB1 to OB4 which are running in parallel. Thus, owing to the fact that it belongs to the operating system, the test program has no influence on the temporal execution of the objects.

Figure 3:
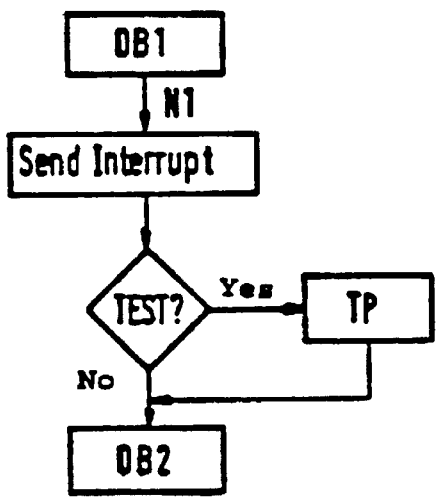
FIG. 3 illustrates the operations when messages are exchanged between two objects.

FIG. 3 illustrates an exemplary embodiment of the process according to the invention with reference to the message exchange between an object OB1 and OB2. The object OB1 causes a message exchange N1 by means of a method call for the object OB2. As a result of its method call N1 the object OB1 causes a send-interrupt at the interrupt handler IH of the operating system. In this case the interrupt handling for sending provides for the saving of the relevant memories of all objects and the status variables required for their operation. This step is performed. The relevant memories in this case are the processor registers. This is followed by an interrogation 'Test?' in other words, is the processor to operate in the test mode. If no test is to be performed, the interrupt handling also provides for an access to a buffer B1 for the object OB1 and transfers the message N1 contained there, which corresponds to the method call, into the buffer B2 for the object OB2. The variables and memory contents previously stored are then reloaded and the normal mode is resumed.

If the test interrogation finds that a test run is present, a branch is made to the test program. The operating system clock is paused. It is then possible to make various inputs and outputs which are required for the performance of a test in the test program. In particular, the allocation information between the object code and the source code is accessed here. The programmer uses only terms known from the source code programming for the specification of the tests.

The method call, the message N1, contains a method index for example. From there a method vector is referenced which contains all branch addresses for the methods permitted in the associated concurrent class, to be precise sorted according to their order, with the associated address ranges from the memory area of the processor. With the aid of the allocation information it is possible, by means of a comparison of the memory areas addressed there, to locate the associated method name again via the method index.

Analogously, it is possible to derive parameter names and parameter values by monitoring byte sequences in the object code and comparing them with byte sequences in the allocation information in connection with the data types. In this way it is readily possible during testing to monitor particular objects and to change parameter values.

At the end of the test program, a branch is made back to the same point of execution which results from a test interrogation that returns 'no'. FIG. 3 is a special version of FIG. 2. The designations are used analogously. This is intended to demonstrate clearly once again that the test program TP is not an object running in parallel with the other objects OB1 to OB4, but rather an integral part of the operating system.

The test program TP is called here for example via an interrupt handling provided in the operating system for the message exchange of messages between objects. This achieves a clean separation between the execution of the individual objects in the parallel and normal mode respectively and between the execution of the test program during test mode. Regardless of how long it takes, the execution of the test program has no effect at all in terms of time on the execution of the individual objects.

Figure 4:
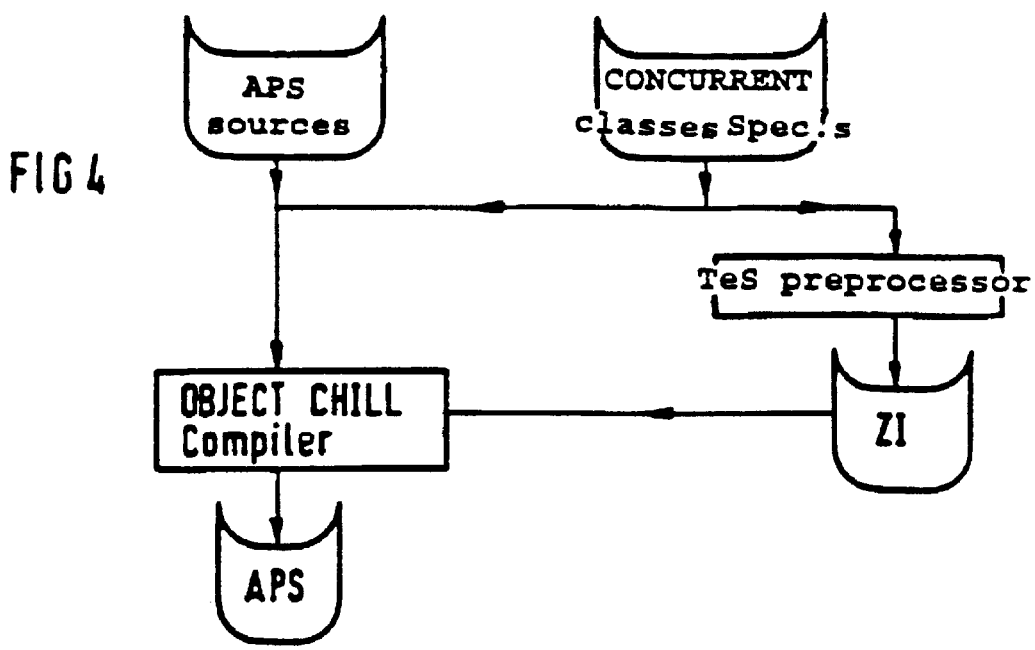
FIG. 4 shows how the allocation information can be generated.

FIG. 4 shows an example of how the allocation information can be obtained and linked during compiling. The information from the concurrent classes Spec.s is prepared in a test system TeS preprocessor. In particular the method vectors of the individual concurrent classes are defined there in connection with their memory areas. In addition, the parameter data types and the corresponding byte sequences of the parameter names and parameter values are defined. This information is then entered in allocation information ZI. The object chill compiler uses the said additional information to generate the site program APS which is then used during testing.

Figure 5A:
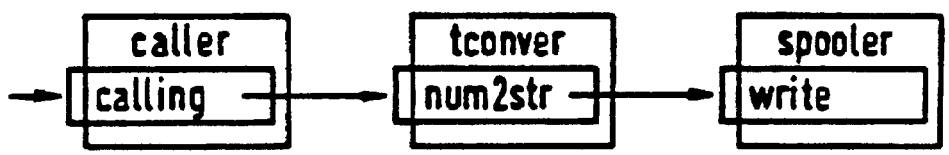
FIGS. 5a and 5b show an example of objects capable of running in parallel which communicate with one another.

FIG. 5a shows an example of three concurrent classes. These classes are denoted caller, tconver and spooler. They each contain one method: caller contains calling, tconver contains num2str and spooler contains write.

From these classes it is possible to derive objects that run in parallel. The method calling calls, for example, num2str and transfers the parameters 0 to 9. The method num2str of the class tconver converts the input parameter (digits 0 to 9) into a character string 'zero' to 'nine'. The method num2str then calls the method write of the spooler class and thus causes the converted digits to be printed out at the terminal.

Figure 5B:
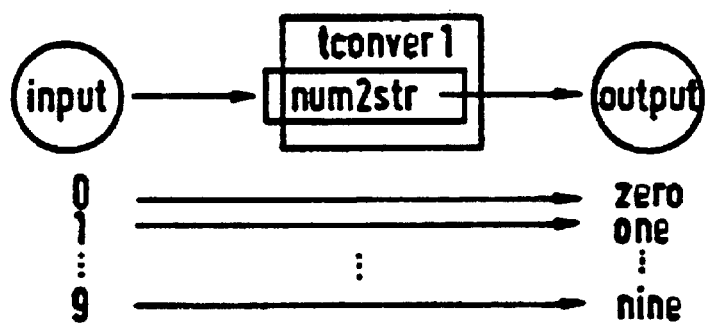

FIG. 5b furthermore shows by way of example an object tconver1 which contains the method num2str. The input for num2str comprises a string of digits and the output of num2str comprises a string of characters as shown in FIG. 5.

One can readily see that a plurality of objects from the concurrent classes caller, tconver and spooler are instantiated which run in parallel with one another. For example, while an object tconver 1 executes a method num2str, at the same time an object caller 2 can call the next digit. This applies analogously to the printing out with an object spooler 3, for example, which prints out the result of a num2str method of an object tconver2 with its method write.

Although other modifications and changes may be suggested by those skilled in the art, it is the intention of the inventor to embody within the patent warranted hereon all changes and modifications as reasonably and properly come within the scope of his contribution to the art.

What is claimed is:

1. A method for performing at least one test on at least one of the objects of an object-oriented program capable of running in parallel on a computer, comprising:
   a) instrumenting an operating system of the computer under which the object-oriented program is intended to run for any number of tests just once in a form that for a test case it accesses information mapping source code language semantics to physical addresses,
   b) before a test, establishing items of information mapping source code language semantics to physical addresses between source code and object code of the object-oriented program from specifications of concurrent classes of the object-oriented program by parsing their source code, and the program elements to be tested are made known to the computer in a suitable way as test subjects,
   c) the communication between parallel running objects takes place by method calls, which are a component part of the object-oriented programming language,
   d) in every communication between two parallel running objects it is tested whether the called or the calling object or the methods used is a test subject,
   e) if d) applies, the test case occurs and for the test interactively input test commands or test commands read in from files are processed,
   f) the test inputs and outputs take place on the source code level of the object-oriented programming language, the information mapping source code language semantics to physical addresses generated under b) being accessed to establish the connection between source code and object code according to a),
   g) the relative runtime behavior of the objects of the tested object-oriented program is not changed by providing that during the processing of the test commands these objects are excluded from the scheduling of the operating system and the system clock is paused.

2. A method according to claim 1, wherein the method calls between the parallel running objects of the object-oriented program are realized by message exchange routines provided in the operating system of the computer, by these routines being instrumented for test purposes.

3. A method according to claim 1, wherein the information mapping source code language semantics to physical addresses comprises two parts, a first item of information mapping source code language semantics to physical addresses between source code and object code of the object-oriented program being linked thereto during the compiling of the operating program and a second part of the information mapping source code language semantics to physical addresses, which serves for method identification, at the runtime is obtained at least by a comparison of a branch address in the memory of the computer with a method index.

4. A method according to claim 1, wherein for the test at least one method call is suppressed, changed and/or additionally incorporated.

5. A method according to claim 1, wherein, for the test, parameter values of a method call are changed.

6. A method according to claim 1, wherein, for the test, runtime of an object is determined by the elapsed system time between two successive method calls.

7. A method according to claim 1, wherein the information mapping source code language semantics to physical addresses relates to method names.

8. A method according to claim 1, wherein the information mapping source code language semantics to physical addresses relates to parameter values.

9. A method according to claim 1, wherein the information mapping source code language semantics to physical addresses relates to parameter data types.

10. A method according to claim 1, in which the information mapping source code language semantics to physical addresses relates to parameter designations.

* * * * *